United States Patent [19]

Pingel

[11] Patent Number: 5,346,553
[45] Date of Patent: Sep. 13, 1994

[54] CABIN FOR SPRAY-COATING WORKPIECES WITH MATERIAL IN POWDER FORM

[75] Inventor: Joachim Pingel, Hamburg, Fed. Rep. of Germany

[73] Assignee: Farb-Tec Gesellschaft fur Beschichtungskabinen, Hamburg, Fed. Rep. of Germany

[21] Appl. No.: 778,100

[22] PCT Filed: Jun. 15, 1990

[86] PCT No.: PCT/EP90/00941
§ 371 Date: Dec. 13, 1991
§ 102(e) Date: Dec. 13, 1991

[87] PCT Pub. No.: WO90/15670
PCT Pub. Date: Dec. 27, 1990

[30] Foreign Application Priority Data

Jun. 16, 1989 [DE] Fed. Rep. of Germany ... 8907539[U]

[51] Int. Cl.⁵ .................. B05L 19/00; B05B 15/12
[52] U.S. Cl. .................. 118/309; 118/326; 15/93.1; 15/98; 454/50; 55/DIG. 46
[58] Field of Search .................. 118/309, 326, 634; 454/50; 55/290, DIG. 46; 15/93.1, 98; 134/9

[56] References Cited

U.S. PATENT DOCUMENTS 3,918,641 11/1975 Lehmann et al. .................. 118/634
4,430,956 2/1984 Koch, II .................. 118/DIG. 7
4,764,220 8/1988 Dinkel et al. .................. 15/93.1

FOREIGN PATENT DOCUMENTS 0200681 11/1986 European Pat. Off. .
3315426 10/1984 Fed. Rep. of Germany .
3412275 10/1986 Fed. Rep. of Germany .
3538800 5/1987 Fed. Rep. of Germany .
3714052 7/1988 Fed. Rep. of Germany .
3516826 6/1989 Fed. Rep. of Germany .

Primary Examiner—W. Gary Jones
Assistant Examiner—Steven P. Griffin
Attorney, Agent, or Firm—Fay, Sharpe, Beall, Fagan, Minnich & McKee

[57] ABSTRACT

A booth for the spray coating of workpieces with a powder coating material has a cleaning device for cleaning the interior of the booth. The walls, ceiling and floor constitute the interior contour of the booth and the cleaning device is dimensioned so that a working gap exists between the cleaning device carrier and the interior contour of the booth. The working gap is bridged elastically by cleaning elements that scrape the booth interior to dislodge powder material that has settled. A vacuum source connected to the cleaning device then sucks the powder material released from the interior surfaces for recycling of the powder and cleaning of the booth.

34 Claims, 6 Drawing Sheets

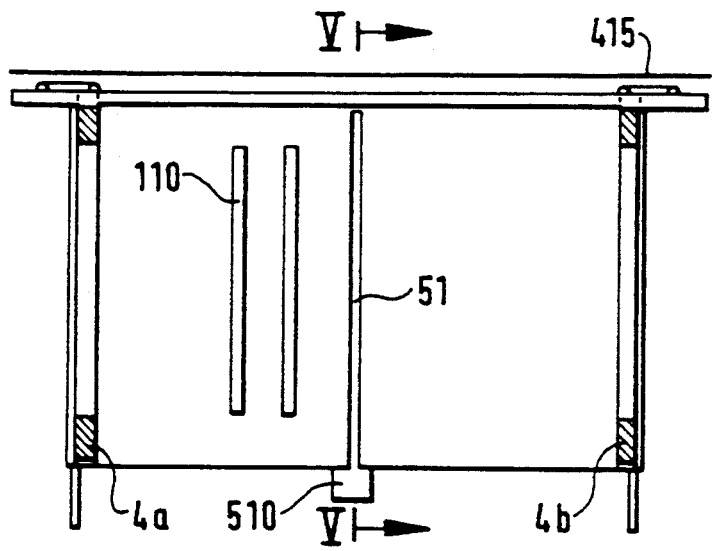
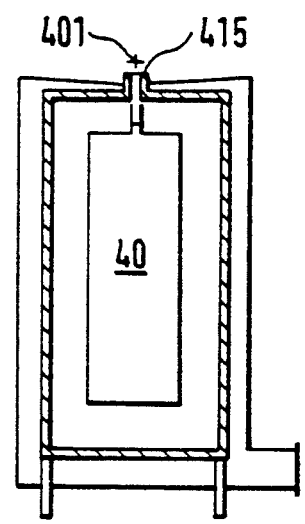
Fig. 4  Fig. 5
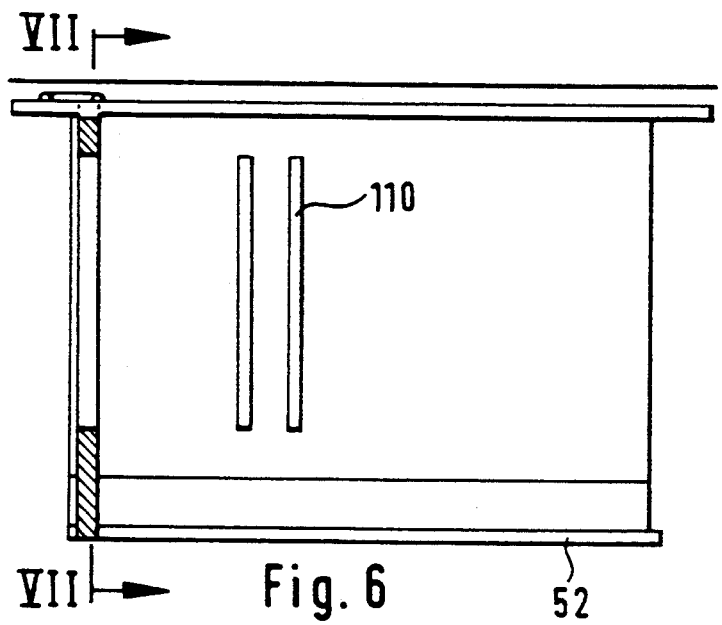
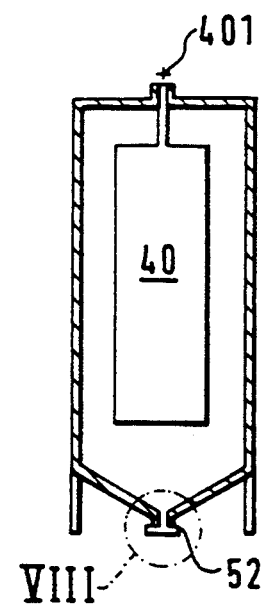
Fig. 6  Fig. 7
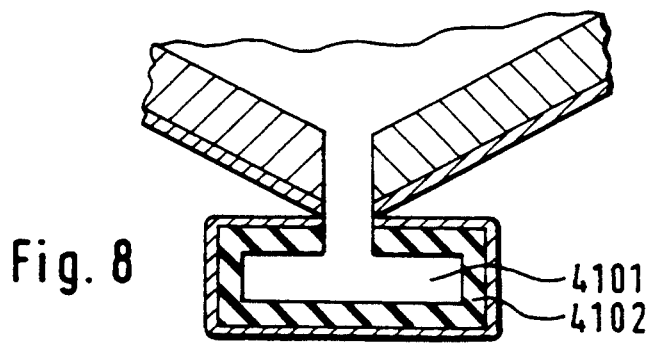
Fig. 8

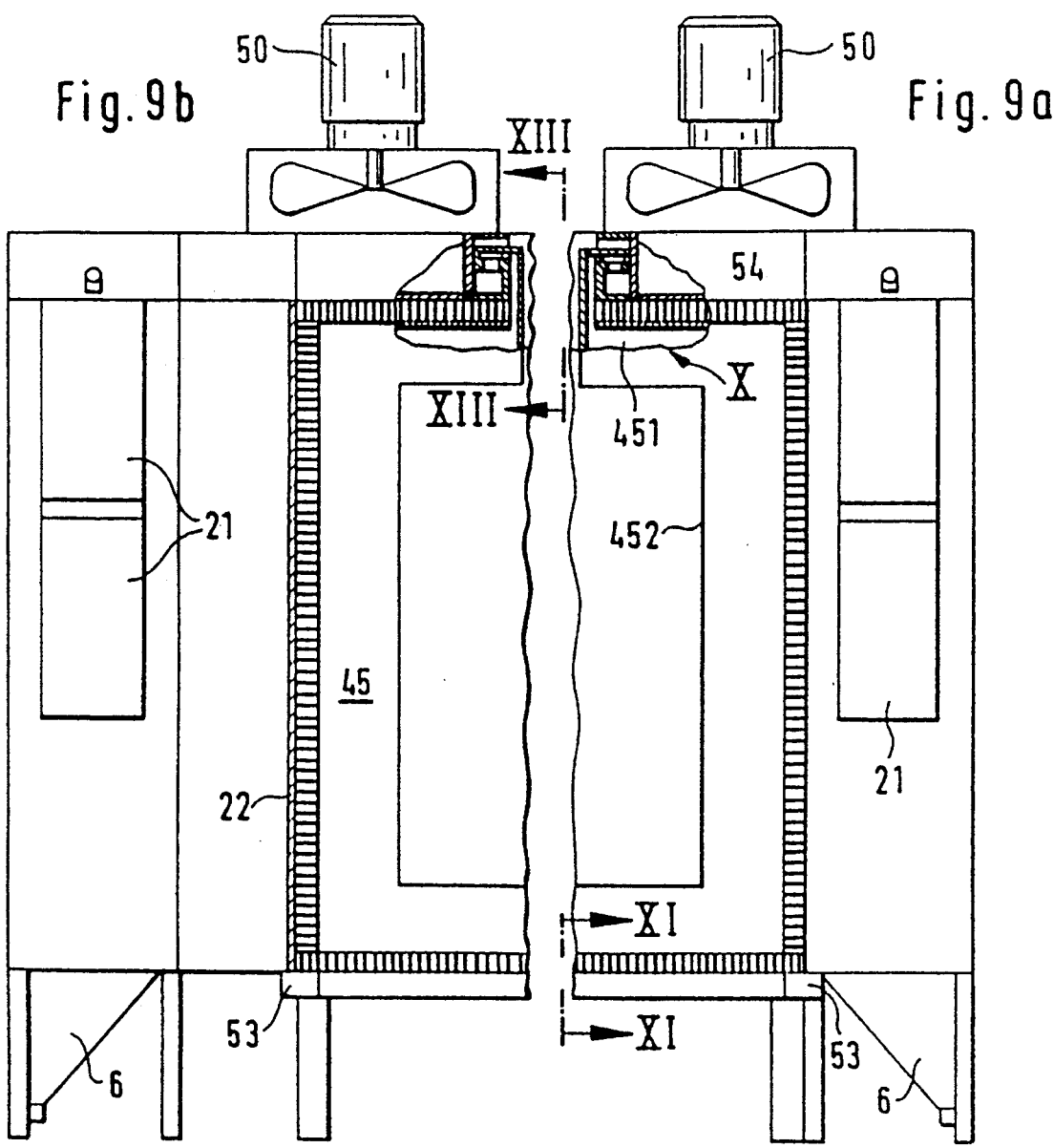
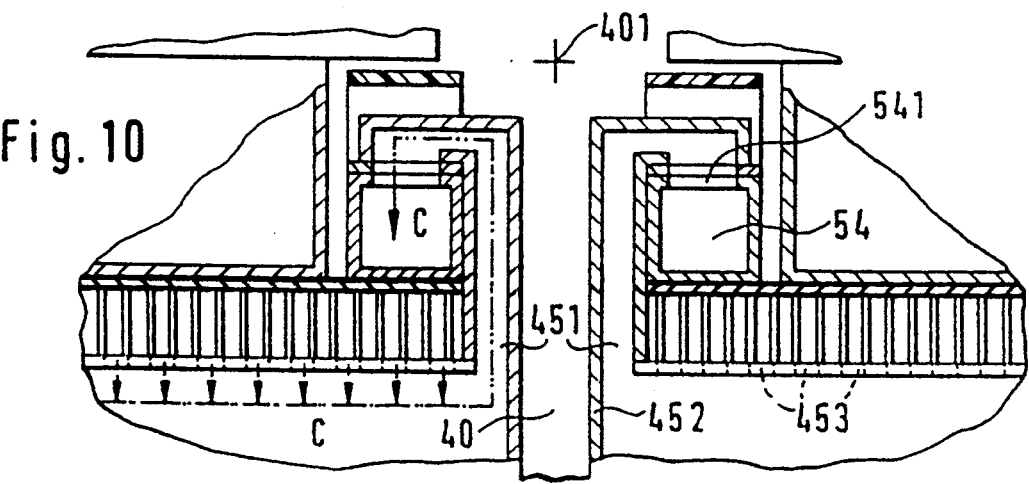

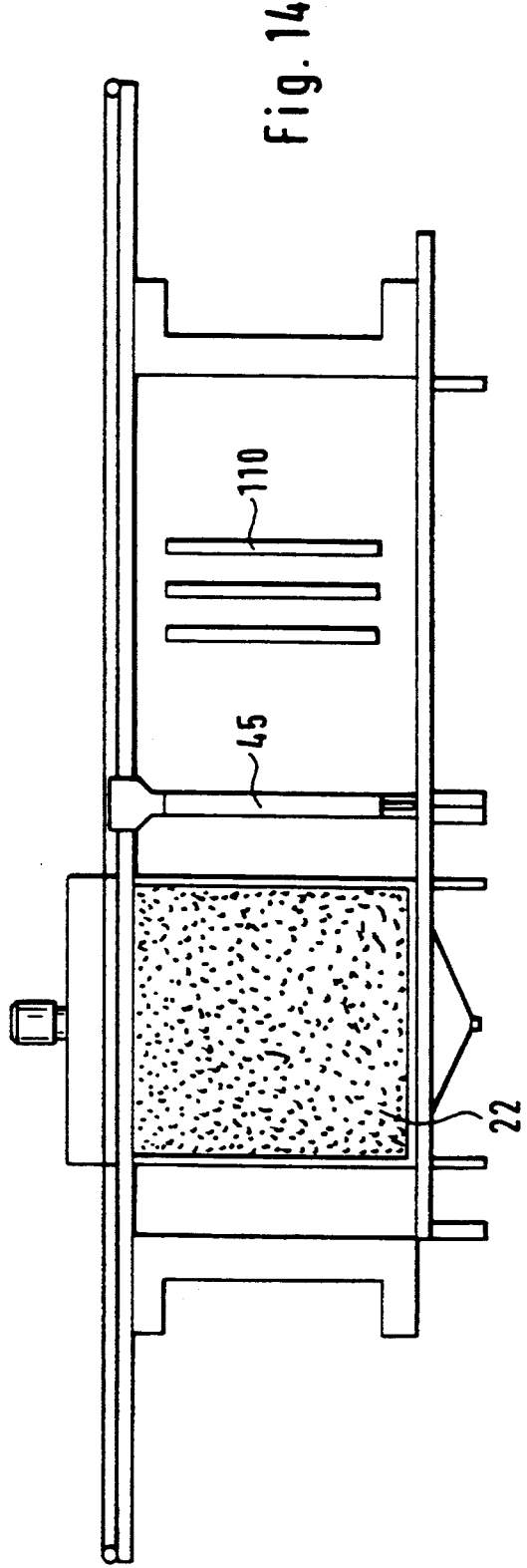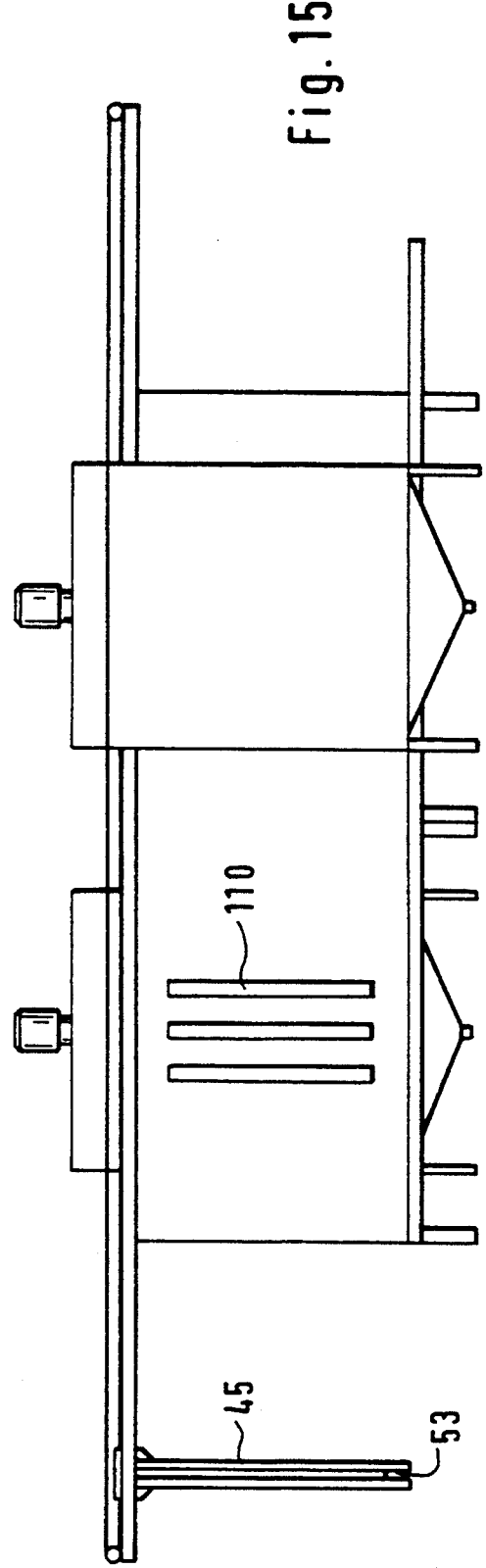

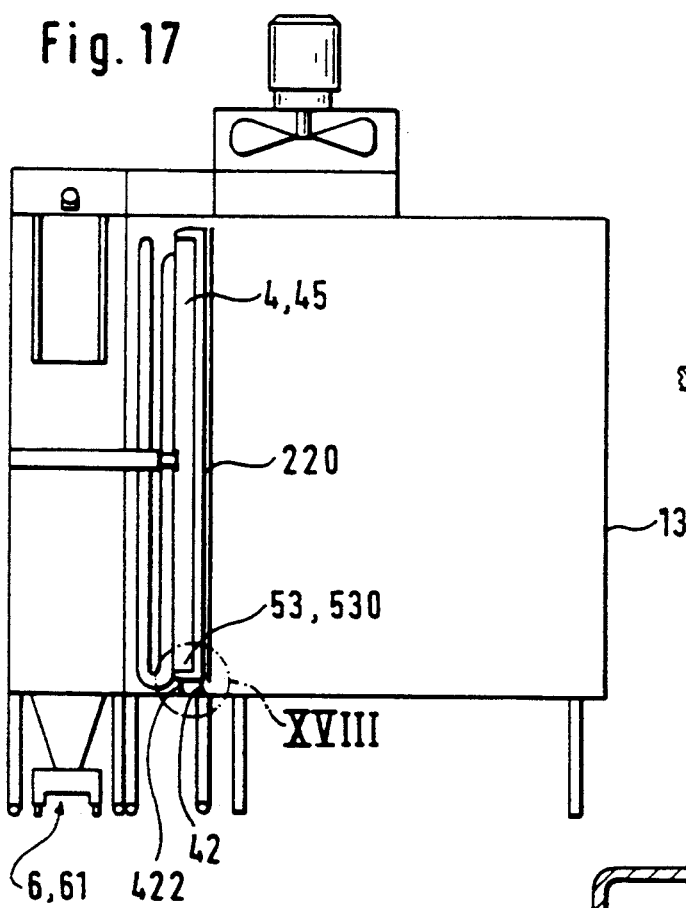
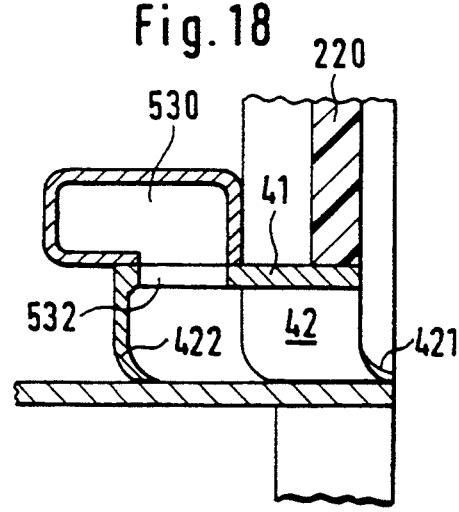
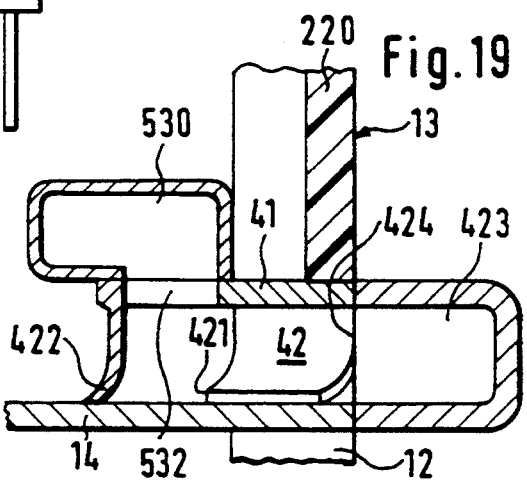
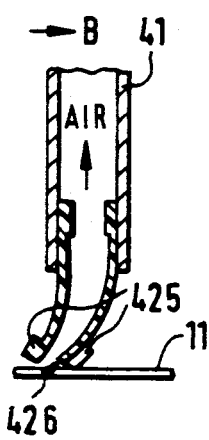
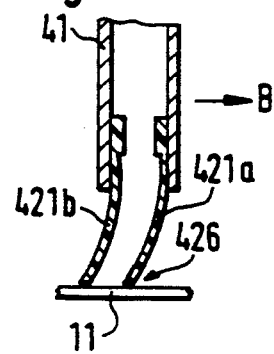
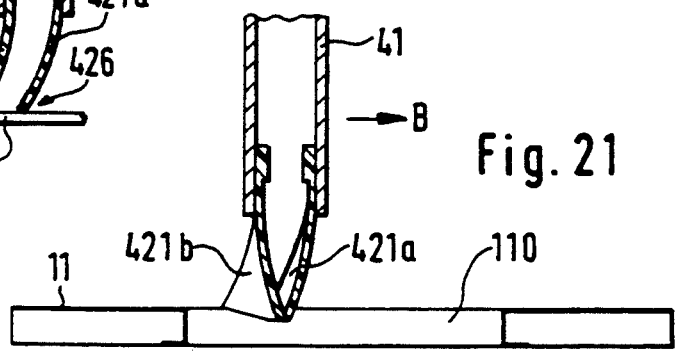

CABIN FOR SPRAY-COATING WORKPIECES WITH MATERIAL IN POWDER FORM

BACKGROUND OF THE INVENTION

1. Field of the Invention

The invention relates to a booth for the spray-coating of articles with powdery coating material, in a booth interior defined by walls, a booth floor and booth ceiling and having a specific longitudinal axis, in the direction of which the workpieces are movable in or through the booth, the booth being assigned a cleaning device which is movable in the booth interior in the direction of its longitudinal axis.

2. Description of Related Art

Booths for electrostatic powder coating are being used increasingly, particularly for reasons of greater environmental compatibility, such as is described in general terms in the VDMA Standard Sheet, 24 371, Part 1 of March 1980 and Part 2 of August 1983. In this, the coating material for the most diverse kinds of constructional or working parts or other articles of daily need is not in the form of a dispersion dissolved in a solvent, that is to say, is not for example put on by the paint-spraying method, but is applied in the form of a granulate. This granulate is, as a rule, conveyed by means of an injector out of a fluidizing vessel through a hose to a powder gun. Mounted in this gun are electrodes which are subjected to high voltage and which charge the powder electrostatically. The charged powder is sprayed by the gun in the direction of the grounded workpiece. The charged powder settles on the workpiece, specifically usually at approximately 40% of the quantity of sprayed material. The powder fraction sprayed past the workpiece is intercepted in the powder booth and returned to the coating process.

It can be seen from this that the main problems of this powder coating method are, on the one hand, to recover as completely as possible the powder not adhering to the article to be coated and, on the other hand, in the event of color changes, to bring about a cleaning of the booth interior which is sufficiently thorough, but above all as rapid as possible, so that the booth can be used again in a short time, that is to say to keep the change-over and therefore idle times as short as possible.

Pursuing the idea of working in a material-saving manner and, when powder-spraying booths are being used, quickly returning to the powder circuit as much as possible of the sprayed powder not adhering to the workpiece, a booth having the form of an upright hollow cylinder has become known (DE-A1-3,538,800). In this is arranged a single-wing or multi-wing ceiling, wall and floor scraper which rotates about the cylinder axis and by means of which excess powder is removed from the inner walls and fed via an inflow in the floor to a powder recovery device. A complete cleaning of the booth, for example in the event of color changes, is therefore impossible, because the scraper, including its driving elements, itself becomes soiled and requires manual cleaning. Furthermore, such continuously operated scrapers cause the powder to agglomerate on the wall and scrapers. Such agglomerates can be removed only by separate cleaning, for example with solvents, in order thereby to avoid the danger of inoperability. With the rotational arrangement, it is virtually impossible to remove excess powder in the central region.

To automate the time-consuming cleaning operation in the event of a color change and to shorten this, there has become known a booth of the type described in the introduction (German Offenlegungsschrift 3,516,826), in which a pipe-ring system movable along the booth axis is provided, this having nozzles through which compressed air is ejected in pulses, in order to swirl the excess powder adhering to the walls. This is then to be sucked away by the main suction, whilst, in order to clean the pipe-ring system itself, nozzles are additionally arranged in the booth end walls. This known cleaning system does not function satisfactorily, because some of the powder, above all comprising very fine fractions, wanders about in the booth space and settles indeterminately, particularly in the corner regions of the booth. This gives rise, in practice, to the need for subsequent cleaning, if appropriate by means of wet sponges, troughs or the like.

In another cleaning system known from practice, the booth walls are formed from a rollable plastic, usually polyethylene sheet. This sheet is kept in stock on rolls which are further rotated in the event of a powder change. For safety reasons, such arrangements are completely inadmissible in many countries and otherwise, above all in view of the problems of sealing occurring between the sheet webs which define the walls and which moreover can be supported only with difficulty, can be employed merely to a limited extent. On the contrary, a principal requirement of spray-coating booths is that the booth housing should have stable walls, in order to avoid the problems of an incompletely sealable booth interior which arise as result of unrolled booth walls and which lead to difficulties in adhering to work-safety and fire protection regulations.

For all these reasons, therefore, manual cleaning methods are generally used today, as before, for booths with stable walls, and the powder adhering in the booth is removed by means of scrapers, sponges, damp cloths or suchlike aids.

SUMMARY OF THE INVENTION

The object of the invention is, therefore, whilst avoiding the disadvantages of the known cleaning methods described, to provide a booth having a cleaning system which allows a complete cleaning, essentially independent of human intervention, if appropriate with simultaneous optimum recovery of unused powder.

This object is achieved, according to the invention, in that the cleaning device comprises a rigid carrier which is equipped with mechanical cleaning elements, such as scrapers, brushes or the like, which, during the working movement of the cleaning device, bear flexibly at least against parts of the cross-sectional contour of the booth interior (inner contour), and in that the cleaning device is so adapted to the inner contour that a working gap is left between carrier and inner contour and is bridged elastically by the cleaning elements.

A booth equipped with such a cleaning device can advantageously be employed both as a continuous-flow booth and as a hand-coating booth. In contrast to the known blow-off method, the design of the booth according to the invention affords the possibility of a controlled satisfactory cleaning of the booth outside the coating operation, for example for the purpose of a color change, by means of a mechanical lift-off, as a result of which the electrostatic charge of the powder adhering to the booth walls is eliminated. At the same time, the mechanical cleaning elements ensure a complete release of the powder from the surface to which it adheres. Because the cleaning elements adapt elastically to the inner wall, unevennesses in the wall region can easily be compensated, so that the interior can be cleaned essentially completely and without leaving residual contamination behind. In this case, the cleaning elements are normally arranged so as to be rotationally continuous, but instances are also conceivable, particularly during the conversion of existing installations, in which, for example, a filter band is present in the floor, with the result that cleaning can be omitted here. Moreover, the cleaning device has, on the one hand, a sufficient rigidity, but on the other hand, above all, an especially high adaptability as regards its cleaning elements and their functioning in respect of unevennesses in the booth wall, so that the best possible cleaning effect can be achieved in a fully automated mechanical way.

It is especially expedient if the cleaning device comprises at least one carrier plate with a contour adapted to the interior of the booth, the cleaning elements in the form of scraping edges to be arranged directed towards the wall with the edge defining this contour. Such a design is especially simple in terms of construction and, since booth interiors are usually made uniform in the direction of the longitudinal axis of the booth, constitutes a design advantageous especially with regard to the production outlay, and indeed also in respect of the possibilities of mounting of the cleaning elements, the function of which is particularly performed in a highly advantageous way as result of the design as scraping edges.

It is extremely advantageous if the cleaning device is assigned directly a vacuum source for sucking away the powder material released from the wall by means of the cleaning device. Whereas, in the known cleaning devices (see, for example, EP-A1-0,200,681 and DE-A1-3,516,826), powder is blown off from the booth walls by compressed air and, in other known booths (DE-U1-8,812,950), suction air is employed only for returning excess powder into the powder circuit during the coating work, in this preferred embodiment of the invention the suction air is now simply used for transporting the powder. Also, in contrast to the known method with compressed air and suction, in which relatively high pressures are required to achieve any kind of reasonable result, which, among other things, can easily lead to the escape of powder from the booth, in a booth according to the invention it is possible to work with a relatively low suction pressure, so that now only low pressure forces occur, the booth wall can be made correspondingly thinner and there is no danger of uncontrolled turbulence in the booth and of an undesirable escape of powder. Furthermore, for many uses, it is in any case more favorable not to reuse the powder obtained during the (final) cleaning of the booth, since this cleaned-off powder, besides the fact that it can easily be contaminated, is of negligible quantity, and therefore it is not worthwhile to have to clean the cleaning device again to obtain it. In addition, a suction cleaning of booth walls, even when these have joints, steps and any deformations, allows the possibility that these, and corners too, can be cleaned completely, without having to be carefully smoothed. The formation of agglomerate can also be prevented still more reliably. The cleaning elements can appropriately be designed as scraping lips made of elastic material, as result of which, for example in the event of deformations of the booth inner wall, adaptation to differences in the working gap can be achieved especially advantageously. In order in any case to guarantee a minimum working gap and, for example if there are orifices on one side (work orifices for spray appliances, suction orifices or the like), to prevent the rigid carrier from drifting to one side so that, in this region, the scraping lips bear too closely against the wall adjacent to such orifices and lose their operability, spacers can be arranged on the rigid carrier, but also on the booth.

In a preferred development of the invention, the scraping lips can be designed as individual elements which extend at an oblique angle relative to the direction of movement and which are offset relative to one another in the manner of guide blades and are arranged with their respective adjacent limiting edges overlapping one another in the direction of movement. As result of these measures, high pressure forces, by which the booth panels would be deformed, among other things, can be avoided, whilst at the same time, as result of the overlap, the cleaning function can be performed completely and in the best possible way. At the same time, where the suction is concerned, the oblique position of the lips provides the flow cross sections and flow directions sufficient for an adequate air flow, as a result of which stripped-off powder is also prevented from adhering to the lips, since the air sweeps in a controlled manner essentially along the scraping edges. An especially high degree of cleaning is achieved if the scraping edges/scraping lips are appropriately provided in a double-ring or double-crown arrangement mutually spaced in the direction of movement and overlapping in respect of the passages between the individual elements, with the result that, during the movement of the cleaning device through the booth, virtually every point of the wall to be cleaned is swept twice by the cleaning elements.

For the sake of simpler production, the scraping lips can be arranged on the carrier as at least one rotationally continuous crown. This makes it possible particularly to carry out the cleaning processes in which smooth booth walls are to be cleaned and no suction air is required. At the same time, the scraping edges/scraping lips can be so arranged on the carrier that they exert pressure forces of differing amounts against the inner contour in the two mutually opposed directions of movement of the cleaning device. Thus, in one direction, for which a lower pressure force is justified, the device can be used for precleaning, whilst, in the opposite direction, final cleaning then takes place at a higher pressure force. The formation of agglomerate can thereby be prevented effectively. With a double-crown arrangement of the scraping lips, similar results are advantageously achieved by arranging the scraping edges/scraping lips in such a way that the respective scraping lip leading in the direction of movement of the cleaning device is applied to the inner contour with a lower pressure force than the respective trailing scraping lip. It is especially favorable, in this, that the cleaning device has to pass across the booth once only for the purpose of cleaning. When suction air is employed between the two crowns, the scraping elements with the lower pressure force, that is to say the leading ones, are lifted slightly, thus forming a gap into which loose powder is sucked. Moreover, this affords an improvement of the flow conditions in respect of the second actual scraping edge, in that the air speed is increased and the flow acts in a controlled manner on the second scraping edge. It is especially advantageous, at the same time, to equip the scraping edges/scraping lips on one side with spacers for producing a specific passage between the scraping edges/lip edges and the inner contour. Consequently, the flow conditions can be controlled very accurately, and an even more intensive flow against the second scraping edge is achieved.

It should be pointed out that, with a double-crown arrangement of the cleaning elements and a suction-air effect in the region of orifices in the booth walls, the scraping lips can fold together, with the result that a drop of suction pressure in the scraping-lip region obviously active outside the orifices can be avoided effectively. It is, of course, likewise possible to combine scraping lips in different positions with one another on one carrier, to make it possible sufficiently to take into account different operating states and constructional details of the various booth forms.

Advantageously, the booth according to the invention can be equipped with a cleaning device which comprises at least one carrier plate and which can be moved into the booth from a booth entry orifice, the source of the suction vacuum being arranged effectively in front of the carrier plate in the direction of movement. On such a carrier plate which can be moved through the booth by motive or other power, the cleaning elements in the form of scraping edges/scraping lips can be arranged satisfactorily and in any desired expedient position. The plate affords a simple separation of the booth-space part to be cleaned from that which has been cleaned, the suction becoming effective directly at the moment when the powder particles are released by the cleaning elements. In conventional hand-operated booth arrangements, the vacuum can be generated by means of a suction device with filtering. For such booths, it is expedient, as a rule, for reasons of construction if the carrier plate sits on a rod-shaped mounting engaging essentially centrally on it and is movable via this by motive power. To have free unimpeded access to the booth orifice during the coating operation carried out in the booth, the carrier plate can be mounted so that it can be swung out in its position of rest in the region of the booth orifice. Of course, the cleaning device or the plate carrying the cleaning elements is guided in a suitable way, so that the working gap is kept uniform and a continuously uniform working of the scraping edges is guaranteed.

On the other hand, for continuous-flow booths, it is especially expedient if these are designed with a two-part cleaning device, the two parts of which are arranged so as to be movable towards one another from the booth ends, the vacuum source being located between the two parts. Of course, here, as in the case of the above-described special hand-operated booth design, any orifice which could bring about a reduction of the pressure head in the booth must be closed with sufficient sealing. In the two-part cleaning device, the vacuum source is preferably provided as a central suction slit extending essentially perpendicularly relative to the direction of movement and forming the booth suction. The two parts of the cleaning device therefore move towards this slit.

Another alternative arrangement for such a suction system can also be that the booth is designed with a suction channel located in the booth floor and extending in the direction of movement of the cleaning device/carrier plate or plates, the carrier plate or plates projecting sealingly into this suction channel. Such a system is advantageous in terms of the overall functioning of the powder-spraying booth, because, here, the suction can take place with a simultaneous utilization of gravity, especially when, in a further development of the invention, the suction channel is arranged centrally in a booth floor extending obliquely downwards towards it.

In another advantageous embodiment of the invention which can be employed in a particularly beneficial way for those booth arrangements which can be used specially as continuous-flow booths and which have lateral orifices, for example for the filter units, the cleaning device is designed as a suction wall with a continuous ring or crown of cleaning elements and a vacuum source, moving with it, directly behind the cleaning elements. Thus, the material released from the booth wall is sucked directly up against the moving carrier wall of the suction device, without first swirling round appreciably in the booth space itself. Such a device is more progressive in its mode of operation, but, on average, somewhat more expensive than the system working with a vacuum virtually static relative to the booth (on the side of the carrier walls at the front, as seen, in the direction of movement) as was described further above. This suction-wall system can be produced in an especially expedient and effective manner if the cleaning elements are provided in a double-crown arrangement and if the vacuum source is located between these crowns. This is therefore a design in which the vacuum source is arranged between the scraping lips within the moving carrier wall and the scraped-off material is sucked into the space between the cleaning elements, that is to say, for example, the scraping lips. Such suction walls are suitable, among other things, precisely also for the conversion of existing installations with a floor filter-band arrangement.

A booth, in which the above-described suction-wall system is used as the cleaning device, can, for example, be designed either with a cartridge-filter suction device alone or with a surface-filter device which is followed by a cartridge-filter device as a secondary cleaning facility. This optionally makes use of the known fact that, with cartridge filters, large production batches can be processed with a high recovery rate, whereas with surface filters, which are more expedient especially for a rapid color change (for example with medium and smaller batch sizes of parts to be coated and frequent color change), because of their lower degree of filtration secondary filters have to be introduced, in order to protect the environment and also ensure sufficient work safety. There are therefore different possibilities for the basic construction of the booth which can be selected according to its main employment intended by the user and which incorporate the cleaning system according to the invention.

Since surface filters have to be relatively large on account of their restricted efficiency, but the booth wall usually cannot be appreciably enlarged because of the necessary filter size, it is expedient, in various uses, to design the booth with a secondary suction-channel system comprising a filter device located outside the booth. The total quantity of air available for the booth and necessary for conveying the powder to the filters and preventing it from escaping from the booth through any other orifices and entering the environment is divided in the same way as the filter system as a whole, specifically, on the one hand, into a filter system located in the booth and in the form of inexpensive surface filters and an air stream guiding powder particles to this filter and, on the other hand, a separate second air stream with a filter system located outside the booth. This second air stream is guided in such a way that it receives powder removed by the cleaning system within the booth, that is to say released by means of the cleaning device according to the invention, and guides it to an external filter system which, for example, can be a separator (cyclone), where the powder is cleaned and conveyed into a powder container for reuse.

It is especially expedient if the secondary suction-channel system is provided as a gutter which is arranged in the floor region of the booth and which is located under the effective region of the filters. It is thus possible to convey powder material, falling from the filters or cleaned by separate devices suitable for this purpose, directly away and to a collecting device, for example in the form of a powder container, without the danger that the powder will wander about in the booth interior.

A further considerable advantage of such a secondary suction system is that only one central powder container is needed for all the filter units. In other words, a single powder container is sufficient even for a series arrangement of a plurality of booth units.

In a design of the invention especially expedient in terms of construction, the suction wall can be mounted movably by means of a drive provided in the ceiling region of the booth and outside the latter and a suction channel can be assigned to it there. Thus, the suction-wall system can be integrated in a simple way even into booths of conventional arrangement, without special constructive measures involving a high outlay. In order to make do with as few additional parts as possible and to provide a constructionally simple and expedient arrangement, the drive can be designed as a driven toothed belt and can be so arranged above the suction channel that the belt sealingly covers that region of an air-inflow slit of the channel respectively exposed during the movement of the suction wall.

To perform its function simply and expediently, the suction wall is preferably designed as a hollow wall with appropriate air-inflow orifices in the immediate region of the cleaning elements/scraping edges/scraping lips.

In a further advantageous embodiment of the invention, the suction wall can be equipped with a sheet-like (flat) filter extending essentially over its entire surface and the secondary suction-channel system can be arranged as a narrow continuous crown or ring. This affords, in a constructionally relatively simple way, a movable filter arrangement which can be used variably for hand-operated and continuous-flow booths. Such a movable flat filter can be cleaned in an especially favorable way, since the suction wall can be advanced as far as the orifice and the attendance crew therefore need not enter the interior of the booth. Moreover, the sheet-like filter can preferably be equipped with a filter-cleaning device, in order to ensure sufficient filter effectiveness in continuous operation. Such a filter-cleaning device can, for example, be a compressed-air device loading the filter rear side in a zone by zone manner, with compressed-air nozzles, if appropriate movable in steps along the filter rear side and loading this oppositely to the filter direction. At all events, it is necessary to ensure that, in this suction-wall arrangement, the secondary suction-channel system is provided only as a relatively narrow ring, so as not to impede the flow cross section behind the filter and a cleaning device provided here for the flat filter. Thus, in this case, the secondary suction-channel system is integrated into the suction wall and forms only an outer ring which at the same time constitutes the mechanical mounting of the filter. It should be ensured, at the same time, that, in the region of the working gap, on the side located opposite the scraping lips, the suction channel is sealed off by means of a sufficient sealing, for example in the form of an elastic continuous sealing lip, against the free passage of air laden with powder.

According to another development of the invention, the booth can be designed with a cleaning-off device for the cleaning elements or scraping lips in the form of a pressure-pulse loading device which can, again, be provided as a compressed-air channel encircling the booth orifice, extending according to the cleaning elements/scraping lips and open towards these. Appropriately, at the same time, the orifice of the compressed-air channel should correspond essentially to the dimension of the working gap, thereby affording a favorable sealing possibility and channel inclusion if, in the foremost position of the cleaning device, the compressed-air channel can be sealingly flush with the carrier of the latter, in such a way that it loads only the cleaning elements/scraping lips. Altogether, therefore, for the cleaning elements, an operable cleaning system making it superfluous to clean off the cleaning elements/scraping lips manually can be provided for these on the booth and can be provided without any appreciable extra outlay in terms of construction, with all the other measures provided by the invention being taken into account and/or included at the same time.

If, as already mentioned, it is not important for powder to be recovered during the cleaning of the booth, because such a recovery would be too time-consuming and/or costly, in that not only the booth, but also the cleaning device itself has to be cleaned, it is especially economical and therefore advantageous, for example in the event of frequently necessary color changes, on the one hand to design the cleaning device as a suction wall and on the other hand to connect it to a collecting filter independent of the powder-recovery separator/filter assigned to the booth. In other words, the cleaned-off powder entering this collecting filter is no longer fed to the powder circuit or for reuse.

The advantages which can be achieved as a whole by the invention are an economically practicable type of cleaning of both hand-operated and continuous-flow booths in an automatic way, thus making it superfluous for the personnel to enter the booth for cleaning purposes and at the same time, in many instances, ensuring an optimum recovery of powder material.

BRIEF DESCRIPTION OF THE DRAWINGS

Further advantages and embodiments or possible versions of the invention emerge from the following description of the exemplary embodiments illustrated in the diagrammatic drawing. In this:

FIG. 4 shows a sectional side view of a continuous-flow booth with a two-sided cleaning device and a central suction slit, FIG. 5 shows a cross section of the booth in the region of the suction slit according to V—V of FIG. 4, FIG. 6 shows a longitudinal section through a modified embodiment of a continuous-flow booth with a longitudinally extending suction channel arranged in the floor region, FIG. 7 shows a cross section through a booth according to VII—VII of FIG. 6, FIG. 8 shows a detail of the suction channel of the booth of FIG. 6 and 7 according to arrow VIII on an enlarged scale, FIG. 9 shows a partially cut-away cross section through a continuous-flow booth with a modified embodiment of a cleaning device according to the invention and with a cartridge-filter cleaning in the right-hand part (FIG. 9a), on the one hand, and with a combined flat-filter and cartridge-filter arrangement in the left-hand part (FIG. 9b), on the other hand, and with a secondary suction channel, as a general view, FIG. 10 shows a detail of the upper part according to arrow X of FIG. 9 on an enlarged scale, FIG. 14 shows a longitudinal section through a modified version of a cleaning device in a continuous-flow booth with a flat-filter arrangement and secondary channel suction, FIG. 15 shows a view from outside of the booth of FIG. 14, with the cleaning device being in the position of rest, FIG. 17 shows a cross section through a booth in an embodiment of a cleaning device with secondary suction integrated into a suction wall, a surface filter movable therewith and secondary cartridge-filter cleaning with a powder-waste container, FIG. 18 shows a detail of FIG. 17 according to the arrow XVIII on an enlarged scale, FIG. 19 shows a detail similar to that of FIG. 18, but in a front position of the movable cleaning device, with an additional cleaning-off possibility for scraping lips carried by the cleaning wall, FIG. 20 shows, in section, a double-crown arrangement of rotationally continuous scraping lips in engagement, FIG. 21 shows the scraping lips of FIG. 20 as they run over a orifice in the booth wall, and FIG. 22 shows an alternative version of the design of the scraping lips of FIG. 20.

DESCRIPTION OF THE PREFERRED EMBODIMENTS

Figure 1:
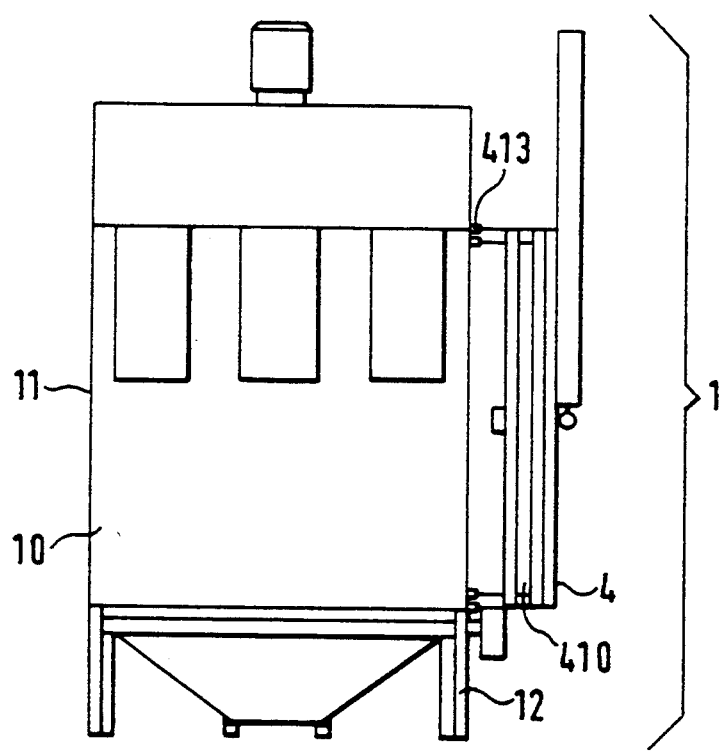
FIG. 1 shows a front view of a hand-operated powder-coating booth with the cleaning device moved out in the swung-out position of rest.
Figure 3:
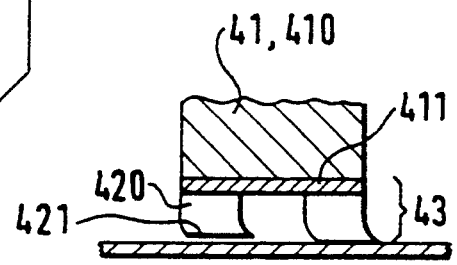
FIG. 3 shows a detail of a scraping-lip arrangement according to arrow III of FIG. 2 on an enlarged scale.
Figure 2:
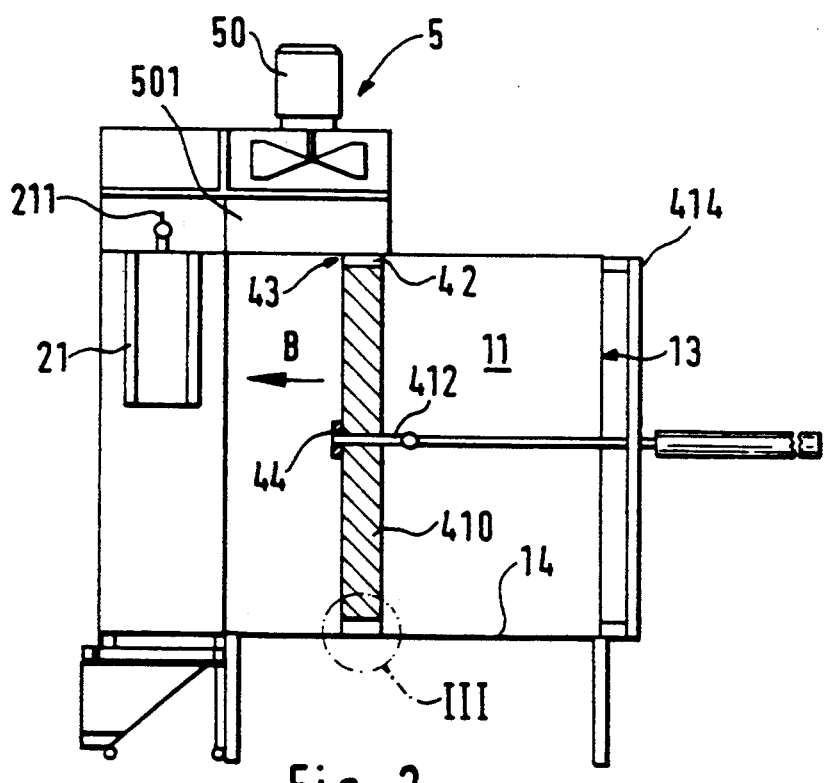
FIG. 2 shows a partially sectional side view of the hand-operated booth of FIG. 1 with the cleaning device in the operating position.

A booth 1 for powder coating, illustrated in FIGS. 1 and 2, defines a booth interior 10 which is sealingly enclosed by a wall 11 and booth ceilings 16 made of stable wall material, for example conventional sheet aluminum or sheet steel, preferably special sheet steel or the like. The booth 1, here designed as a hand-operated coating booth, rests on a stable supporting stand 12 provided underneath a booth floor 14 and has a front orifice 13, from which articles introduced into the booth interior are coated by means of conventional spray guns which, for the sake of clarity, are no more shown than are the articles to be coated themselves. Located on the rear side of the booth 1 is a filter-housing portion with an arrangement of filters 2 which are provided here as cartridge filters 21. In order to convey excess coating material, that is to say coating material which has not settled on the surface of the workpiece to be coated, up to the cartridge filters 21, the filter arrangement 2 is connected to a suction 5 which here comprises a 2-stage suction fan 50 with a channel system 501 assigned to the cartridge filters 21. The sucked-off air cleared of excess powder in the filter can, insofar as the degree of cleaning is sufficient, be discharged into the ambient air, whilst for a possibly insufficient cleaning of the air a secondary filtration system can or must be provided. For powder separated at the filter there is a powder-collecting container 6. In the simplest case, the return of the powder settled on the filters 21 is obtained by pressure loading via compressed-air connections 211, so that the powder can fall down into the collecting container 6 located underneath.

However, as shown in further following exemplary embodiments, the air cleaning can be carried out just as well by surface filters 22 (FIG. 9a), separators in the form of cyclones, not shown here, secondary suction channels 53 (FIG. 9) with external filters and combinations of such or similar filter and/or separator arrangements. The choice of constructional units of this kind depends entirely on the intended use of the booth. But since these are conventional measures, they need not be discussed in any more detail at this juncture.

The guiding idea of the present invention is the provision of a cleaning system for the booth in the event of a color change and/or after the coating of a specific number of workpieces, and it is important, above all, to reduce the idle times and to make the booth ready for use again as quickly as possible. For this purpose, a cleaning device 4 is provided which in the case of the hand-operated coating booth 1 of FIGS. 1 and 2 is provided as a single part. It comprises a carrier 41 which is mounted on a mounting 412 operated by motive power. The carrier 41 is guided in a reliably positioned manner in a suitable way, but a way which need not be described in any more detail here, and has as essential constructional elements a carrier plate 410, the contour or edge 411 of which is adapted to the cross-sectional form of the booth interior 10. The edge 411 leaves a working gap 43 in relation to the inner wall. This working gap is filled or bridged by a cleaning element 42 which comprises elastic scrapers 420 mounted suitably on the carrier plate and equipped with scraping edges or scraping lips 421. These elements can be seen in detail in FIG. 3, FIG. 11 and FIGS. 20-22.

FIG. 1 shows the cleaning device 4 in the position of rest, the carrier 41, that is to say the carrier plate 410 with its mounting 412, being drawn out of the booth and swung out of the orifice 13 of the booth through 90° by means of a pivot bearing 413 of its suspension 414, so that the booth is opened from the orifice 13 for the purpose of carrying out the manual coating.

In order to clean the booth interior 10, that is to say particularly the wall 11, the carrier plate 410 is first pivoted in front of the orifice 13 and then moved into the booth interior by means of the drive, as can be seen in FIG. 2. At the same time, a vacuum is generated by the suction fan 50 in front of the carrier plate 410 in the direction of movement B, whilst normal pressure prevails behind the carrier plate. The scraping lips 421 lift off or strip off powder located on the booth wall 11. As a result of this mechanical releasing operation, the electrostatic charge of the powder is eliminated, and the latter is transported in the direction of the cartridge filter or filters 21 solely by means of the vacuum generated by the suction fan 50.

In the detailed embodiments of FIGS. 3, 11 and 20–22, the scraping lips 421 are arranged in the form of two crowns on the circumference of the carrier plate 410, but a single crown, such as, for example, in FIG. 19, or a multiple crown arrangement can just as well be provided, depending on the particular construction of the booth and the cleaning requirements demanded. The principle of this cleaning is that of a window-cleaning rubber, but without the scraping lips having to perform any transport function in addition to the stripping off of the powder. On the contrary, this transport is taken over by the suction air, so that only low pressure forces against the booth wall are necessary. Tolerances in the booth can be compensated by the elasticity of the scraping lips and their length.

As emerges from the examples of FIGS. 3, 9–12 and 19, the scraping lips can be arranged as individual elements in the crown. In this version with individual elements, the cleaning effect is increased by an overlap of the lips which, as emerges in principle from FIG. 12, can advantageously be achieved, for example, by an oblique position in relation to the direction of movement B of the carrier. A double-crown or multiple-crown arrangement can have the same effect. Furthermore, the adaptation to unevennesses in the booth sheet which easily occurs during operation can be improved by a small lip width.

For other uses also described, a rotationally continuous arrangement of scraping lips 421 in the single or multiple crown is provided, as emerges from FIGS. 20–22, in contrast to the individual elements of FIGS. 3, 9–12 and 19.

The principle of the stripping off of excess powder settled on the booth walls by means of the scraping elements, scraping edges or scraping lips and the removal of the stripped-off powder by means of suction air is also put into practice in other hereafter explained embodiments in the way described for the booth version of FIGS. 1 and 2, and therefore this principle need not be discussed in detail again for each individual exemplary embodiment.

In order, when filters other than the cartridge filter 21 are used, that is to say, for example, when cyclones are employed, to make it possible also to clean off an end wall limiting its housing portion and in addition at the same time the front side of the carrier plate 410, there is provided on this a rotary spray nozzle 44, the spray effect of which is sufficient, in conjunction with the suction fan, to remove the powder adhering only relatively loosely in this region and present to a lesser extent than in the main booth.

Instead of the arrangement of cartridge filters with a suction fan for sucking off the powder, the booth can also be equipped with a cyclone separator, but this need not be discussed in more detail here because its arrangement and use are sufficiently known in the state of the art.

A two-part design, shown in FIGS. 4 and 5, of the cleaning device 4 with device parts 4a and 4b is especially suitable for continuous-flow booths. These two cleaning-device parts are moved from the ends of the continuous-flow booth 1 illustrated towards a central suction slit 51 which here forms the vacuum source. In order to achieve the necessary cleaning effect, of course, the entry and exit orifices 13 open in a continuous-flow booth have to be closed, suitable partitioning measures being provided for this purpose. The central suction slit 51 opens into a suction channel 510 which leads to a powder separator and to the color-collecting container (not shown here).

Here, the cleaning device, driven in a suitable way, is mounted on rollers 415 in the upper region of the booth outside the booth interior. Slits 110 in the booth wall 11 can also be seen; guns for automatic coating can be introduced through these slits. These slits too have to be closed by respectively suitable means during the cleaning of the booth, in order to prevent the possibility of a reduction of the vacuum.

FIGS. 6 and 7 show a continuous-flow booth 1 which is similar to the version of FIGS. 4 and 5, but which is equipped with only one cleaning device 4. The essential difference is that the booth floor 14 is inclined towards the middle and terminates here in a suction channel 52 which extends in the longitudinal direction of the booth over the entire length of the latter. This channel 52 is again connected in a suitable way to a separator and powder-collecting container which are not shown in any more detail.

The arrangement of this channel 52 on the booth floor can be seen in detail in FIG. 8. The carrier plate 410 of the cleaning device engages with appropriate profiling into this channel. The edges of this profiled carrier-plate part 4101 are equipped with elastic sealing elements 4102, in order to close the suction channel relative to the normal-pressure or overpressure side when the cleaning device 4 is in operation. Material stripped off from the booth walls by the cleaning device is sucked off continuously through this suction channel 52, gravity cooperating with this, additionally with the inclined design of the booth floor 14 being utilized. In other words, therefore, the carrier plate ensures sealing in the channel region between normal pressure and a vacuum, so that no direct air flow between these two pressure regions can occur via the suction channel, but instead the stripped-off material falls into the channel and can be fed to the recovery system.

Of course, the sealing elements 4102 can also be designed as strippers, in order immediately to eliminate a possible residual adhesion of powder material in the channel region, or a combined arrangement of scraping lips and sealing elements is provided.

FIG. 9 illustrates an alternative version of the cleaning system according to the invention, specifically in two different embodiments of the booth construction with regard to the filtration, of which one is shown in the right-hand part (FIG. 9a) and the other in the left-hand part (FIG. 9b). Thus, FIG. 9a illustrates a filtration by means of cartridge filters 21, specifically in conjunction with a suction fan 50 already described further above. In contrast, in FIG. 9b, a surface filter 22 is mounted in the booth wall, and behind it a cartridge filter 21, likewise coupled to a suction fan 50, is located for secondary cleaning in a corresponding housing portion. Powder receptacles 6 in the form of suitable containers are arranged under these cartridge filters 21 of the two alternative embodiments.

Figure 12:
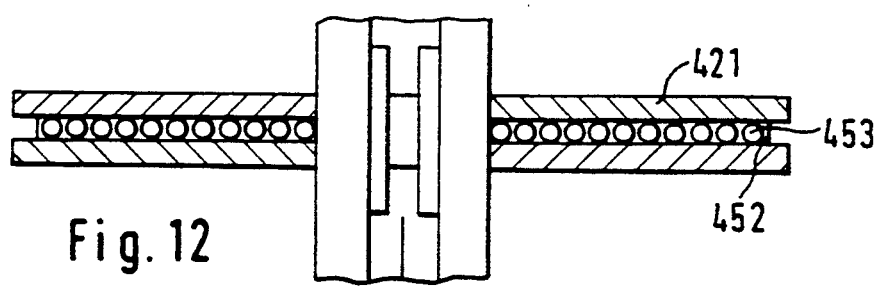
FIG. 12 shows, on an enlarged scale, a partial top view of the cleaning device of FIG. 9, with components unnecessary for understanding the functioning being omitted.
Figures 11, 13:
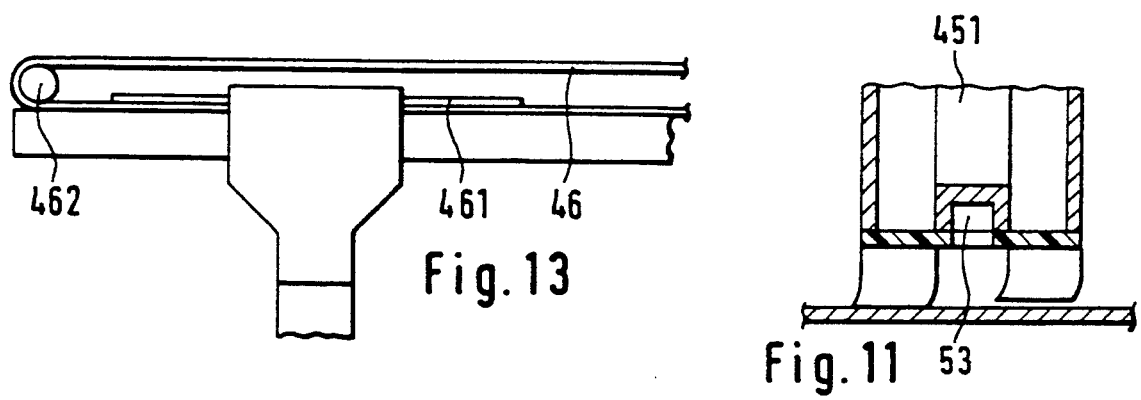
FIG. 11 shows a detail according to section XI—XI of FIG. 9 on an enlarged scale.
FIG. 13 shows a side view, on an enlarged scale, of the mounting of the cleaning device of FIG. 9 on a movement mechanism.

As can be seen from FIG. 9, especially in conjunction with the detailed representation of FIGS. 11 and 12, in this embodiment of the cleaning device 4 the carrier 41 is designed as a suction-wall hollow body 45 which carries a double arrangement of scraping lips 421. Between the two scraping-lip crowns is located a continuous suction channel 451. This suction channel is connected in the way shown in FIG. 10 to a suction channel 54 arranged on the top side of the booth, this suction channel 54 being formed in the ceiling region of the booth outside the booth interior. As can be seen from FIG. 10, the suction channel 54 produced from sectional material is integrated in a suitable way into the mounting of the hollow body 45. The suction wall 45 is slidably connected by mounting via carriers 452 on the top side of the suction channel 451 equipped with a continuous air-inflow slit 541. The suction wall 45 is connected to a toothed-belt drive 46 rotating at the end via deflecting rollers 462 (FIG. 13) and is moved by this. The fastening to this toothed belt 46 is obtained via a holding plate 461, and the belt band of the toothed belt 46 covers the air-inflow slit 541 of the suction channel over its entire length, with the exception of the holding region for the suction wall. Between the two crowns of the cleaning elements 42/421 are arranged, in the edge surface of the hollow body 45, holes 453, through which stripped-off powder material can pass as a result of the suction effect into the interior of the hollow body 45 and there, on the path represented by the arrow C of FIG. 10 (double dot - and - dash line), into the suction channel 54, by way of which it is then transported to the separator and powder-collecting container.

Such a cleaning system with a suction wall can be used especially beneficially in those cases where, as indicated in FIG. 9, lateral orifices are provided in the booth wall for filter units, such as surface filters.

FIG. 9 also shows a possible variation as regards the suction of powder material not received, during coating, by the workpieces to be coated. For this purpose, there is provided a secondary suction channel 53, here in the corner regions of the booth floor 14, which can receive falling material both during the main operation of the booth, that is to say during the coating, and during cleaning by means of the cleaning device 4. For this purpose, the secondary suction channel 53 is connected to a vacuum-generating unit, for example a cyclone, located outside the booth. The entire flow of spent air is thus divided into two air streams, one air stream being guided out of the booth by the filter elements during coating operation and through the suction channel 54 in the ceiling region during cleaning, whilst the other air stream, during the coating operation, transports powder especially wandering about in the lower corner regions, via the secondary suction channel 53, or, during the cleaning operation, transports fallen powder separated by the filters to a powder container located outside the booth, an additional filter surface being provided there for the separation of powder and air to be discharged into the environment. The advantage of such a suction-flow division is that surface filters have to be made very large to achieve a sufficient cleaning capacity, but as a rule the booth wall need not be appreciably enlarged with regard to the filter size then necessary. By the possibility of the arrangement of one or more external filters, the separating capacity of surface filters, lower than that of cartridge filters, can thus be compensated in a simple way. A further advantage is to be seen in that, when appropriate, only one central powder container is needed for all the filter units, that is to say one central powder container is sufficient even for a series arrangement of a plurality of booth units, and the currently customary known transport alternatives, such as a vibrating floor in the booth, fluid floor, transport by means of injectors, etc., thus become superfluous.

A version of a continuous-flow booth incorporating the suction wall is illustrated in FIGS. 14 and 15, FIG. 14 showing the suction wall 45 in operation and FIG. 15 the latter in the position of rest. Here too, a secondary suction channel 53 is provided, specifically in combination with two surface filters distributed over the length of the booth.

Figure 16:
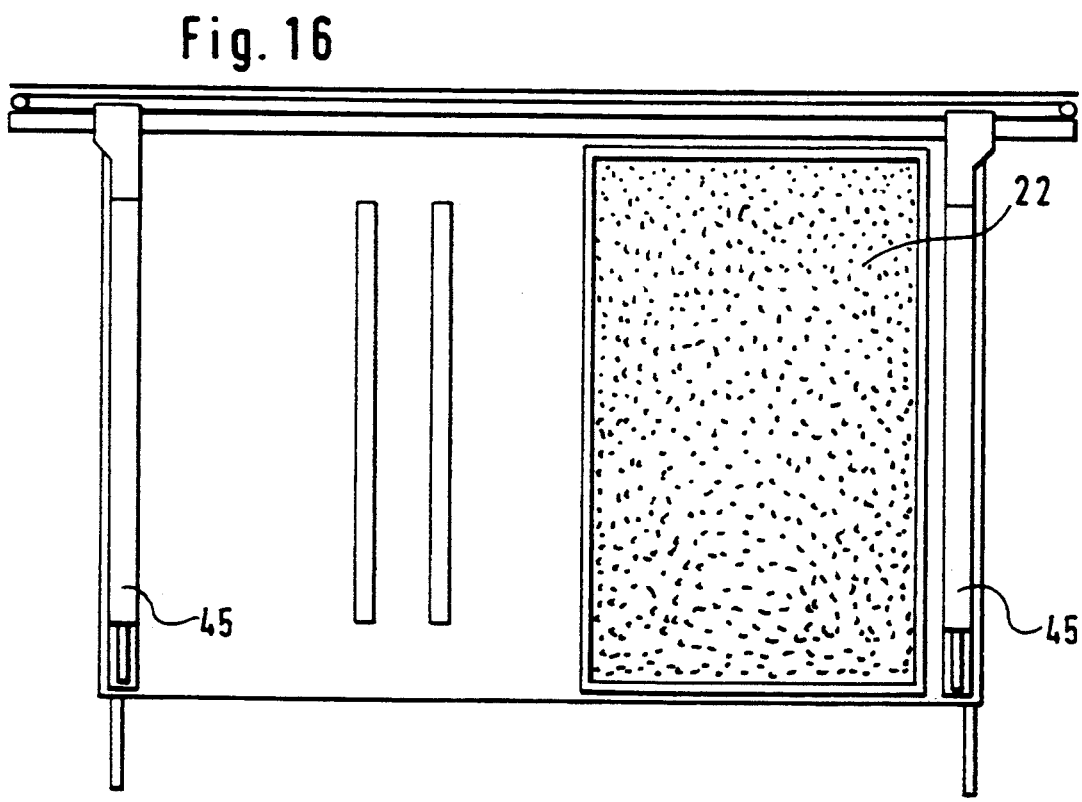
FIG. 16 shows a booth similar to that of FIG. 14, but with two cleaning devices.

FIG. 16 shows an alternative version of a continuous-flow booth with two suction walls in an arrangement similar to that of FIG. 4 for a vacuum wall.

In the embodiment illustrated in FIG. 17, the suction wall 45, as a combination of a secondary channel suction in the form of a secondary suction channel 530 extending continuously in the form of a ring or crown, is equipped with a surface filter 220 movable through it. In this arrangement, therefore, on the one hand the suction wall is employed as a carrier for the surface filter in its working position, and on the other hand the suction wall is used according to its function for cleaning the booth inner walls. Since the suction wall can be moved out as far as the booth orifice 13, it is easily possible, when the booth is being cleaned, to clean the surface filter in a position which makes it unnecessary for attendance personnel to enter the booth. The surface of the suction wall behind the flat filter 220 is virtually free, that is to say the carrier 41 is not a continuous plate (as in other exemplary embodiments), but constitutes a ribbed component or the like, so that the air stream passing through the filter is not impeded. Thus, the secondary suction channel 530, on which the scraping lips, combined with a sufficient seal, rest, is present virtually only in the contour region of the suction wall and forms the continuous base for the cleaning elements. With this form of design of the suction wall, it is possible to operate booths selectively as hand-operated or as continuous-flow booths. In the latter case, the suction wall is moved transversely relative to the direction of conveyance of the workpieces.

The detail of the cleaning device 4 of FIG. 17 in the lower floor region can be seen in FIG. 18. In this, a sealing lip 422 is arranged behind the scraping lip 421 of the cleaning element 42, so that, when a vacuum is generated in the secondary suction channel 530, air is sucked into this channel through its orifice 532 from the front side of the filter and can guide powder material, stripped off from the booth walls by the scraping lips 421, directly into the secondary suction channel, without contaminating the space behind the filter 220. The connection with the abovementioned external filter unit is made by means of a secondary suction hose 533.

FIG. 19 then shows another possibility for cleaning off the cleaning elements 42 or the scraping lips 421 themselves, in that, in the front position of the cleaning device 4 with the surface filter 220, a compressed-air channel 423 is provided in the booth along its edge, though this cannot be seen in FIG. 17. This channel 423 extends round the front side of the booth orifice 13, specifically according to the arrangement of the crown of cleaning elements 42. When the scraping lips have reached the front edge of the booth, the end face of the carrier 41 carrying the scraping lips is flush with the inner edge of the compressed-air channel 423 and leaves open only its orifice 424 towards the suction channel 530. Generated in the channel are compressed-air pulses which remove the powder from the scraping lips and which, when a corresponding vacuum is generated in the annular channel 530, suck it into this, so that it can pass from there to an external secondary filter unit and be returned to the powder circuit.

As can be seen from the embodiments of the cleaning device 4 in FIGS. 5, 7, 9 and 10, the latter, when used in continuous-flow booths, can be equipped with a passage 40 for unimpeded workpiece transport, for example by means of circular conveyors 401 (merely indicated), or be pivoted or moved out of the region of the workpiece conveyance.

The scraping lips 421 according to FIGS. 20–22, arranged as rotationally continuous crowns, are so mounted that, as seen in each case in the direction of movement of their carrier 41, they bear with a pressure force of differing amount against the wall 11 (and/or the floor/ceiling). This is obtained here by means of the differences in the freely movable length of the lips as a result of their mounting and abutments, that is to say fixed points on the carrier, in that the bearing points are spaced from the lower edge of the carrier. However, for example, supporting plates can also be provided for this purpose. As can be seen, in the conveying direction B, the leading scraping lip 421a has a lower pressure force relative to the base than the trailing lip 421b. As a result of the greater distance here between the fixed point and bearing point, the leading scraping lip 421a forms, for a predetermined elasticity, a larger arc of curvature than the lip 421b supported against the carrier edge, so that it comes closer to the latter than in the gap between the two plates of the carrier 41, that is to say a channel widening from the base to the carrier is obtained between the scraping lips.

As a result of the differing pressure force between the lip crowns 421a, b, during working/cleaning without suction air the leading lip 421a executes essentially only a precleaning and transports away a large part of the powder to be cleaned off, whereas the trailing lip 421b exerts a greater scraping effect on the base 11 and ensures a thorough final cleaning. The powder cleaned off in this way is fed to a collecting container or a collecting suction inside or outside the booth.

When work is carried out with suction air, that is to say when the carrier 41 is designed as a suction wall, as a result of the vacuum in the wall the lip 421a is lifted slightly and the trailing lip 421b is pressed down more firmly. By way of the gap 426 obtained between the lip 421a and the wall 11, a large quantity of the loosely lying or adhering powder can be sucked into the suction wall, whilst at the same time an acceleration of the air flow and powder flow and their alignment with the scraping edge of the trailing lip 421b take place. Thus, the residual powder scraped off by the latter is absorbed especially effectively into the air stream.

Of course, if the carrier 41 runs in the opposite direction, the same effect is obtained in each case, except that the functions of 421a and b are reversed.

As can be seen in relation to FIG. 21, a further advantage of this lip arrangement is that, when it runs over recesses in the base, such as, for example, slits 110 (see FIGS. 4, 6, 14 and 15), as a result of the suction the two lips 421a, b come to bear with their free edges against one another and thus block the suction path. A drop of suction pressure in the suction wall is thereby prevented simply and effectively.

As the exemplary embodiment of FIG. 22 shows, spacers 425 can be provided at the free edges of the lips 421 for the purpose of a specific formation of the gap 426.

Essentially one-piece scraping lips, such as those shown in FIGS. 20–22, have some advantage over the individual elements in an oblique arrangement, insofar as they can be cleaned easily, even by hand, and the plates of the carrier 41 can easily be dismounted individually for maintenance and cleaning purposes.

Of course, as can be ascertained from the description, in the light of a competent assessment of this by an average person skilled in the art, many further variations and combinations of the features described, coming within the scope of the invention, and consequently embodiments of the invention modified in relation to those shown are possible and conceivable, without the inventive deliberations of an average person skilled in the art being required for this.

I claim:

1. A booth for the spray-coating of workpieces with powdery coating material, comprising a booth interior defined by walls, a booth floor and a booth ceiling, said booth interior having a specific longitudinal axis and interior cross-sectional contour, in a direction of which the workpieces are movable into or through the booth, a cleaning device which is movable in the booth interior in a direction of movement along the longitudinal axis, and a vacuum source connected to the cleaning device, the cleaning device comprising a rigid carrier which is equipped with mechanical cleaning elements, which, during the working movement of the cleaning device, bear flexibly at least against parts of the interior cross-sectional contour of the booth interior, wherein the cleaning device is dimensioned so that a working gap is left between the carrier and the interior cross-sectional contour that is bridged elastically by the cleaning elements and wherein the cleaning device through a connection to the vacuum source sucks away powder material released from the booth interior walls by the cleaning elements.

2. A booth according to claim 1, wherein the carrier comprises at least one carrier plate with a contour adapted to the interior cross-sectional contour of the booth.

3. A booth according to claim 2, wherein the cleaning elements include scraping edges and are arranged to be directed towards the wall in an edge of the carrier plate, the edge defining the contour.

4. A booth according to claim 3, wherein the scraping edges are equipped on one side with spacers for producing a specific passage between the scraping edges and the interior cross-sectional contour.

5. A booth according to claim 4, further comprising a suction device with filtering, wherein the suction device and the vacuum source are arranged on a common side of the cleaning device.

6. A booth according to claim 4, wherein the cleaning device includes a suction wall with a continuous crown of cleaning elements and connected to the vacuum source directly behind the cleaning elements.

7. A booth according to claim 6, wherein the cleaning elements are provided in a double-crown arrangement, and the vacuum source is located between the crowns.

8. A booth according to claim 6, further comprising a cartridge-filter suction device.

9. A booth according to claim 8, further comprising a surface-filter device, wherein the cartridge-filter suction device is provided as a secondary cleaning device.

10. A booth according to claim 6, further comprising a secondary suctionchannel comprising a filter device located outside the booth.

11. A booth according to claim 10, wherein the secondary suctionchannel arrangement includes at least one gutter which is arranged in the booth floor and which is located under an effective filtering region of the filters.

12. A booth according to claim 10, wherein the suction wall includes a sheet-like filter extending essentially over the entire suction wall surface, and wherein the secondary suction channel is arranged as a narrow crown or a ring continuous along the contour of the suction wall.

13. A booth according to claim 12, wherein the secondary suction channel includes a suction orifice directed into the working gap and with an elastic sealing lip extending in a ring-like fashion from an edge of the carrier towards the booth wall, the secondary suction channel being open to the scraping edges.

14. A booth according to claim 12, wherein the sheet-like filter includes a filter-cleaning device.

15. A booth according to claim 14, wherein the filter-cleaning device includes a compressed-air device for loading a filter rear side in a zone-by-zone manner, with compressed-air nozzles movable along the filter rear side to load the filter rear side oppositely to the direction of movement of the cleaning device.

16. A booth according to claim 6, wherein the suction wall is mounted movably by means of a drive provided in one of an interior of a ceiling region of the booth and outside of the ceiling region, and a suction channel is connected to the suction wall.

17. A booth according to claim 16, wherein the drive includes a driven toothed belt, the drive being arranged above the suction channel such that the driven toothed belt sealingly covers that region of an air-inflow slit of the suction channel respectively exposed during movement of the suction wall.

18. A booth according to claim 6, wherein the suction wall includes a hollow wall with appropriate air-inflow orifices.

19. A booth according to claim 3, wherein the cleaning device includes a suction wall including a sheet-like filter, said suction wall being connected to a collecting filter independent of the sheet-like filter.

20. A booth according to claim 2, wherein the cleaning device comprising at least one carrier plate can be moved into the booth from a booth entry orifice, the vacuum source being arranged effectively from the carrier plate in a direction of the longitudinal axis.

21. A booth according to claim 1, wherein the cleaning elements include scraping edges made of elastic material.

22. A booth according to claim 21, wherein the scraping edges are designed as individual elements which extend at an oblique angle relative to the direction of movement and which are offset relative to one another with respective adjacent ends of adjacent elements overlapping one another in the direction of movement.

23. A booth according to claim 22, wherein the scraping edges are provided in a double-crown arrangement mutually spaced in the direction of movement and overlapping in passages between individual elements.

24. A booth according to claim 21, wherein the scraping edges are arranged on the carrier as at least one rotationally continuous crown.

25. A booth according to claim 24, wherein the scraping edges are so arranged on the carrier that they exert pressure forces of differing amount against the interior cross-sectional contour in both the direction of movement and opposed thereto.

26. A booth according to claim 24, wherein the scraping edges are so provided in a double-crown arrangement that a leading scraping edge leading in the direction of movement of the cleaning device is applied to the interior cross-sectional contour with a lower pressure force than a trailing scraping edge.

27. A booth according to claim 1, wherein the cleaning device is a two-part cleaning device, the two parts being arranged so as to be movable towards one another from booth ends, the vacuum source being located between the two parts.

28. A booth according to claim 27, wherein the vacuum source includes a central suction slit extending essentially perpendicularly relative to the longitudinal axis.

29. A booth according to claim 1, wherein the vacuum source includes a suction channel located in the booth floor and extending in the direction of movement of the cleaning device, and wherein the rigid carrier projects sealingly into the suction channel.

30. A booth according to claim 29, wherein the suction channel is arranged centrally in a booth floor extending obliquely downwards towards the suction channel.

31. A booth according to claim 1, further comprising a pressure-pulse loading device for cleaning the cleaning elements.

32. A booth according to claim 31, wherein the booth includes a booth entry orifice through which the cleaning device is moved into the booth, and the pressure-pulse loading device includes a compressed-air channel encircling the booth entry orifice, and open towards the cleaning elements.

33. A booth according to claim 32, wherein the compressed-air channel has a channel orifice having a size dimension that corresponds essentially to a size dimension of the working gap.

34. A booth according to claim 32, wherein, in a foremost position of the cleaning device, the compressed-air channel is sealingly flush with the carrier of the cleaning device, in such a way that the compressed-air channel loads only the cleaning elements.

* * * * *

UNITED STATES PATENT AND TRADEMARK OFFICE
CERTIFICATE OF CORRECTION

PATENT NO. : 5,346,553
DATED : September 13, 1994
INVENTOR(S) : Joachim Pingel

It is certified that error appears in the above-indentified patent and that said Letters Patent is hereby corrected as shown below:

On title page, item [73] Assignee, should read as follows:

--Farb-Tec Gesellschaft fur Beschichtungskabinen

Systeme mbH--.

Signed and Sealed this

Twenty-ninth Day of November, 1994

Attest:

BRUCE LEHMAN

*Attesting Officer*   *Commissioner of Patents and Trademarks*